US012298466B1

(12) United States Patent
Zhang et al.

(10) Patent No.: US 12,298,466 B1
(45) Date of Patent: May 13, 2025

(54) MONITORING METHOD FOR SPRING PROTECTION, DEVICE, MEDIUM AND ELECTRONIC EQUIPMENT

(71) Applicant: Shandong Provincial Geo-mineral Engineering Exploration Institute (801 Hydrogeological Engineering Geological Brigade of Shandong Geology and Mineral Exploration and Development Bureau), Shandong (CN)

(72) Inventors: Yunfeng Zhang, Shandong (CN); Zhiqiang Zhao, Shandong (CN); Guantao Ding, Shandong (CN); Wen Liu, Shandong (CN); Qianqian Lu, Shandong (CN); Minghui Lyu, Shandong (CN)

(73) Assignee: Shandong Provincial Geo-mineral Engineering Exploration Institute (801 Hydrogeological Engineering Geological Brigade of Shandong Geology and Mineral Exploration and Development Bureau), Shandong (CN)

( * ) Notice: Subject to any disclaimer, the term of this patent is extended or adjusted under 35 U.S.C. 154(b) by 0 days.

(21) Appl. No.: 18/919,507

(22) Filed: Oct. 18, 2024

(51) Int. Cl.
*G01V 9/02* (2006.01)
(52) U.S. Cl.
CPC ..................... *G01V 9/02* (2013.01)
(58) Field of Classification Search
CPC ....................................... G01V 9/02
See application file for complete search history.

(56) References Cited

U.S. PATENT DOCUMENTS

2018/0368341 A1* 12/2018 Wang ................. B01J 20/12
2024/0320594 A1*  9/2024 Kawasaki .............. G06Q 50/06

FOREIGN PATENT DOCUMENTS

| CN | 220225546 U | * | 12/2023 |
| CN | 118065432 A | * | 5/2024 |
| CN | 117947802 A | * | 8/2024 |

* cited by examiner

*Primary Examiner* — Arleen M Vazquez
*Assistant Examiner* — Lynda Dinh
(74) *Attorney, Agent, or Firm* — Cooper Legal Group, LLC

(57) ABSTRACT

A monitoring method for spring protection, the method comprises: based on an actual flow rate of a spring eye, determining whether the flow rate is interfered by an urban construction project, and if so, determining a descending rate of the flow rate under an interference of urban construction projects; determining a corresponding target duration range according to the descending rate, and determining a corresponding interference node of the urban construction project in each groundwater recharge path, wherein the target duration range is a duration range required for the urban construction project to generate interference on the flow and determining a target flow duration of the groundwater from each interference node, and if the target flow duration is within the target duration range, determining the urban construction project to which the corresponding interference node belongs to be a preferentially censored project.

7 Claims, 2 Drawing Sheets

MONITORING METHOD FOR SPRING PROTECTION, DEVICE, MEDIUM AND ELECTRONIC EQUIPMENT

TECHNICAL FIELD

The present application relates to a technical field of spring protection, and particularly relates to a monitoring method for spring protection, a device, a medium and an electronic equipment.

BACKGROUND ART

Spring is one type of groundwater, and a spring or spring pool is a place where groundwater naturally emerges from surface of the ground. Formation of spring is usually related to geological structures. When an aquifer beneath the surface of the ground is covered by an impermeable layer and has a certain slope, the groundwater will flow along an inclination direction. When encountering faults or intrusive rock barriers in rock formations, these confined waters will emerge at weak points on the surface of the ground, forming springs. Spring protection mainly refers to taking measures to ensure that the quality and quantity of spring are maintained so as to maintain the state of sustainable utilization. Among these, spring protection involves an important aspect to prevent the spring from drying up, as the drying up of springs can have a severe impact on local ecological environment.

At present, with a rapid development of cities, a large number of construction projects are performed, and most of these construction projects involve the process of strata excavation, once the excavation damages or changes the groundwater channels, the flow rate direction of groundwater changes, resulting in the water flow rate to the spring pool being affected, with a greater risk of spring drying. Moreover, with the multitude of construction projects in cities, it is difficult to quickly trace back to the construction project that generates the risk of spring drying.

Therefore, how to quickly trace the construction project that generates a risk of spring drying has become an urgent technical problem to be solved.

SUMMARY

In order to quickly trace back to the construction project that generates the risk of spring drying, the present application provides a monitoring method for spring protection, a device, a medium and an electronic equipment.

A first aspect of the present application provides a monitoring method for spring protection, specifically including:

obtaining an actual flow rate of a spring eye of a monitored spring pool at a current time;

determining, based on the actual flow rate of the spring eye, whether the flow rate of the spring eye of the monitored spring pool is interfered by an urban construction project, and if so, determining a descending rate of the flow rate of the spring eye of the monitored spring pool under an interference of the urban construction project;

determining a corresponding target duration range according to the descending rate, and determining a corresponding interference node of the urban construction project in each groundwater recharge path of the monitored spring pool, wherein the target duration range is a duration range required for the urban construction project to generate interference on the flow rate of the spring eye of the monitored spring pool; and determining a target flow duration of the groundwater from each interference node to the monitored spring pool, and if the target flow duration is within the target duration range, determining the urban construction project to which the corresponding interference node belongs to be a preferentially censored project.

The present application includes at least one of the following beneficial technical effects: if the flow rate of the spring eye is interfered by the urban construction project, which indicates that the large probability of the flow rate of the spring eye of the monitored spring pool will show a descending trend, then the descending rate of the flow rate of the spring eye is determined. Then, according to the descending rate, the corresponding target duration range is determined, and the faster the descending rate is, the quicker the urban construction project will interfere with the flow rate of the spring eye of the monitored spring pool. Furthermore, if the target flow duration is within the target duration range, it indicate a large probability that the corresponding interference node can make the flow rate of the spring eye of the monitored spring pool decrease at a descending rate, then the urban construction project to which the corresponding interference node belongs is determined as the preferentially censored project, and when the risk censorship of the urban construction project is carried out, the preferentially censored project is censored, so that the source can be traced back to the urban construction project which has the interference to the flow rate of the spring eye efficiently and quickly, and then the interference can be carried out timely to reduce the risk of the spring drying of the monitored spring pool.

DETAILED DESCRIPTION

In order that the person skilled in the art would better understand the technical solution of the present description, the embodiments of the present description will now be described clearly and fully hereinafter with reference to the accompanying drawings, in which embodiments of the description are shown. It is to be understood that the embodiments described are only a few, but not all embodiments of the present application.

Figure 1:
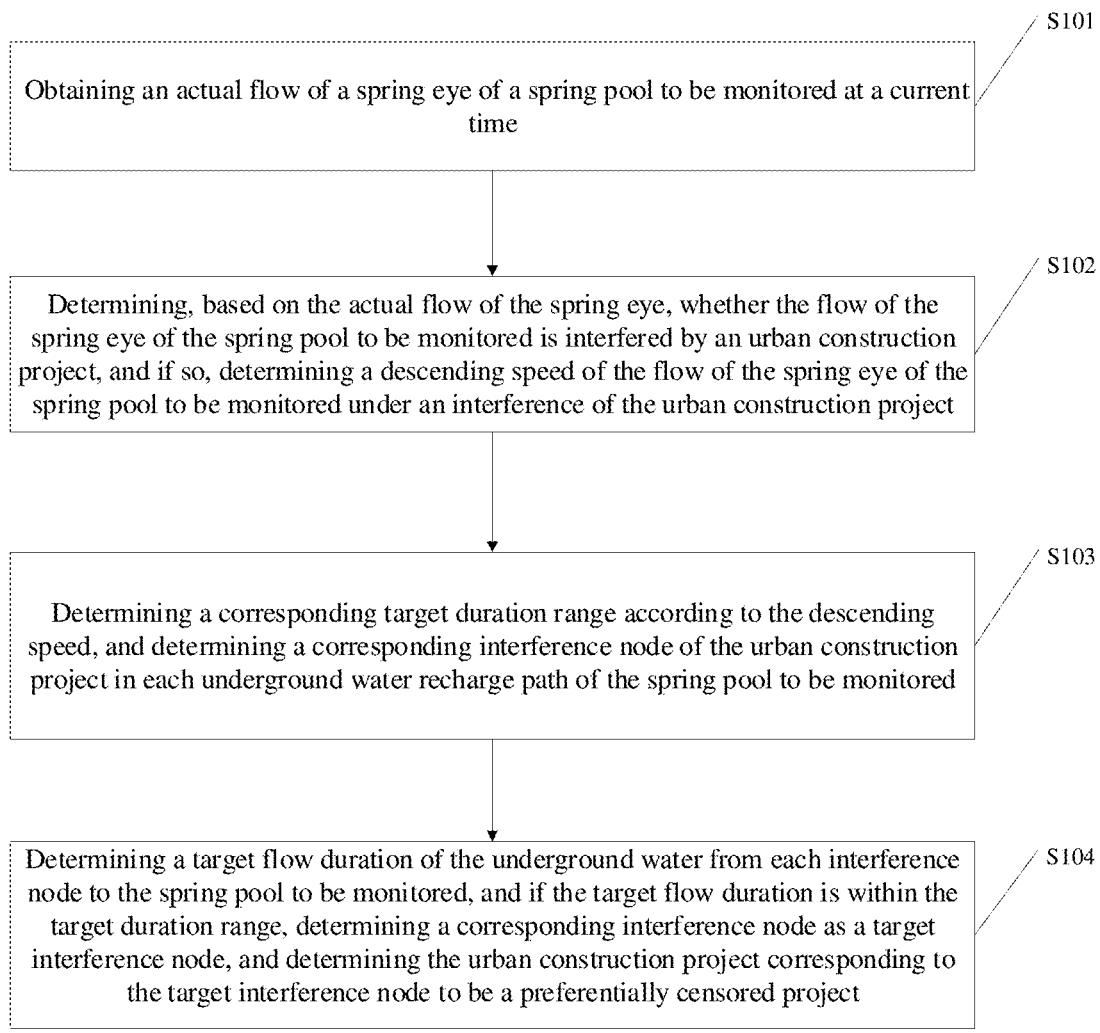
FIG. 1 is a schematic flowchart of a monitoring method for spring protection provided in an embodiment of the present application.

Refer to FIG. 1, the embodiment of the present application discloses a schematic flowchart of a monitoring method for spring protection, which is applied to a monitoring device for spring protection and can also run on a monitoring device for spring protection based on the Von Neumann architecture. The computer program can be integrated into an application, or run as an independent tool application, and specifically includes:

S101: an actual flow rate of a spring eye of a monitored spring pool at a current time is obtained.

Specifically, in the embodiment of the present application, the monitored spring pool is a spring that is an object of spring protection and undergoes spring eye flow rate monitoring. The spring eye refers to a orifice from which spring flows out in a monitored spring pool, that is, the source of the spring. The flow rate of the spring eye refers to a volume of water emerging from the spring eye per unit time. The unit time can be 1 minute or, in other embodiments, it can also be 1 hour. It should be noted that an executive body of the monitoring method for spring protection disclosed in the embodiment of the present application is a server, and the server can be an independent physical server or a server cluster or distributed system composed of multiple physical servers. In addition, in the embodiment of the present application, the spring eye of the monitored spring pool is single, and in other embodiments, the spring eyes of the monitored spring pool may be multiple.

Furthermore, a feasible method to obtain the actual flow rate of the spring eye of the monitored spring pool at a current time is that the server obtains the actual flow rate of the spring eye in the monitored spring pool at the current time use an electromagnetic flowmeter or an ultrasonic flowmeter near the spring eye of the monitored spring pool. In other embodiments, remote sensing monitoring methods such as satellites or unmanned aerial vehicles can also be used to obtain image data of the spring eye area of the monitored spring pool, and the actual flow rate of the spring eye can be obtained through image processing and analysis techniques.

S102: based on the actual flow rate of the spring eye, whether the flow rate of the spring eye of the monitored spring pool is interfered by an urban construction project is determined, and if so, a descending rate of the flow rate of the spring eye of the monitored spring pool under an interference of the urban construction projects is determined.

Specifically, after the actual flow rate of the spring eye is determined, it is necessary to further determine whether the flow rate of the spring eye of the monitored spring pool is interfered or influenced by urban construction projects, and a feasible implementation method is to judge whether the actual flow rate of the spring eye is within the standard flow rate range, and the standard flow rate range of the spring eye is a range of the flow rate of the spring eye under normal conditions without being disturbed by construction projects or heavy rainfall and other factors that have a significant impact on the spring eye flow rate. If the actual flow rate of the spring eye at the current time is not within this standard flow rate range of the spring eye, it indicates that the flow rate of the spring eye of the monitored spring pool is being interfered by abnormal situations, then, at least one target flow rate of the spring eye of the monitored spring pool within a preset time after the current time is continuously obtained, and based on each target flow rate of the spring eye and the actual flow rate of the spring eye, a curve of the actual flow rate of the spring eye, namely, a curve of the flow rate of the spring eye changing with time, is drawn through the plot function in the MATLAB tool. Furthermore, the curve of the actual flow rate of the spring eye is fitted with a preset curve of a flow rate of the spring eye interfered by the project to obtain a first fitting rate through the MATLAB tool, wherein the engineering interference spring eye flow rate curve is a curve of the flow rate of the spring eye changing with time under an influence of construction projects. It should be noted that urban construction projects refer to construction projects under construction in the current city.

If the first fitting rate is greater than a fitting rate threshold, it indicates that the two curves are similar, thereby, it is determined that the flow rate of the spring eye of the monitored spring pool is affected by the construction project, and the flow rate of the spring eye will show a descending trend; conversely, if the first fitting rate is not greater than the fitting rate threshold, it indicates that the anomaly of the flow rate of the spring eye in the monitored spring pool is not interfered by urban construction projects.

Furthermore, if it is determined that the flow rate of the spring eye of the monitored spring pool is interfered by urban construction projects, then a descending rate of the flow rate of the spring eye of the monitored spring pool under the interference of the urban construction project is determined, and a feasible determination method is, based on a time interval between the current time and a time node corresponding to the next target flow rate of the spring eye, subtracting the actual flow rate of the spring eye from the next target flow rate of the current time, and dividing the difference by the time interval to obtain the descending rate of the flow rate of the spring eye. The greater the descending rate of the flow rate of the spring eye, the faster the corresponding urban construction projects is interfering with the flow rate of the spring eye to be monitored.

S103: a corresponding target duration range is determined according to the descending rate, and a corresponding interference node of the urban construction project is determined in each groundwater recharge path of the monitored spring pool.

Specifically, after the descending rate of the flow rate of the spring eye is determined, a target duration range corresponding to the descending rate is matched from a preset duration range matching table, wherein the target duration range is a duration range required for the urban construction project to interfere with the flow rate of the spring eye of the monitored spring pool, and the duration range matching table includes different rates of decline and corresponding duration ranges. The greater the rate of decline of the flow rate of the spring eye, the faster the flow rate of the spring eye decreases, and it indicates that the quicker the urban construction project can interfere with the flow rate of the spring eye. Consequently, the starting duration and an end duration of the target duration range are shorter. For example, if the rate of decline of the flow rate of the spring eye is a1 and a2, with a1 being greater than a2, then the target duration range corresponding to the rate of decline a1 is 10 to 15 minutes, and the target duration range corresponding to a2 is 20 to 30 minutes.

Further, more in the embodiment of the present application, the groundwater recharge path refers to a natural channel through which water in an underground aquifer or water-containing system emerges to the spring eye through geological structures such as cracks and pores. The groundwater recharge paths corresponding to the monitored spring pool are multiple, and in other embodiments, the groundwater recharge path corresponding to the monitored spring pool can also be single. The pre-established groundwater flow model of the current city using Visual MODFLOW software is retrieved. The groundwater flow model refers to a tool for groundwater flow regulation which is based on the finite element method, finite difference method or boundary element method and other numerical modeling methods as well as the current city's stratigraphic structure, aquifer parameters, surface water conditions, groundwater lever status, precipitation and other data to describe an input-output response relationship of groundwater system. Through simulation of groundwater flow rate, parameters of groundwater such as flow rate velocity, flow rate direction and water level can be obtained, thereby, analyze the recharge and discharge mechanism of groundwater system.

Furthermore, according to the location information of the spring eye passing through the monitored spring pool, each groundwater recharge path of the spring eye of the monitored spring pool is determined via the groundwater flow model. Then, the information of each groundwater recharge path is integrated into a preset urban three-dimensional geological model, and according to the location information about the ongoing urban construction projects, an interference node or interference position of each urban construction project in the corresponding groundwater recharge path once the spring eye flow rate is interfered by each urban construction project, that is, potential interference point generated due to the construction and affecting the water amount and the water flow rate path in the corresponding groundwater recharge path, is determined.

S104: a target flow duration of the groundwater from each interference node to the monitored spring pool is determined. If the target flow duration is within the target duration range, a corresponding interference node is determined as a target interference node, and urban construction project corresponding to the target interference node is determined to be a preferentially censored project.

Specifically, after the interference node in the groundwater recharge path of the monitored spring pool is determined, the water flow rate of the groundwater recharge path with the interference node is determined through the groundwater flow model, and the total length from each interference node to the spring eye of the monitored spring pool is divided by the water flow rate of the corresponding groundwater recharge path to obtain the target flow duration from the corresponding interference node to the spring eye of the monitored spring pool. Furthermore, whether each target flow duration is within the target duration range is estimated, and if the target flow duration is within the target duration range, it indicate a large probability that the corresponding interference node can make the flow rate of the spring eye of the monitored spring pool decrease at a descending rate, then the urban construction project to which the corresponding interference node belongs is determined as the preferentially censored project, and when the risk censorship of the urban construction project is carried out, the preferentially censored project is censored, so that the source can be traced back to the urban construction project which has the interference to the flow rate of the spring eye efficiently and quickly, and then intervention can be carried out timely to reduce the risk of the spring drying up of the monitored spring pool.

Figure 2:
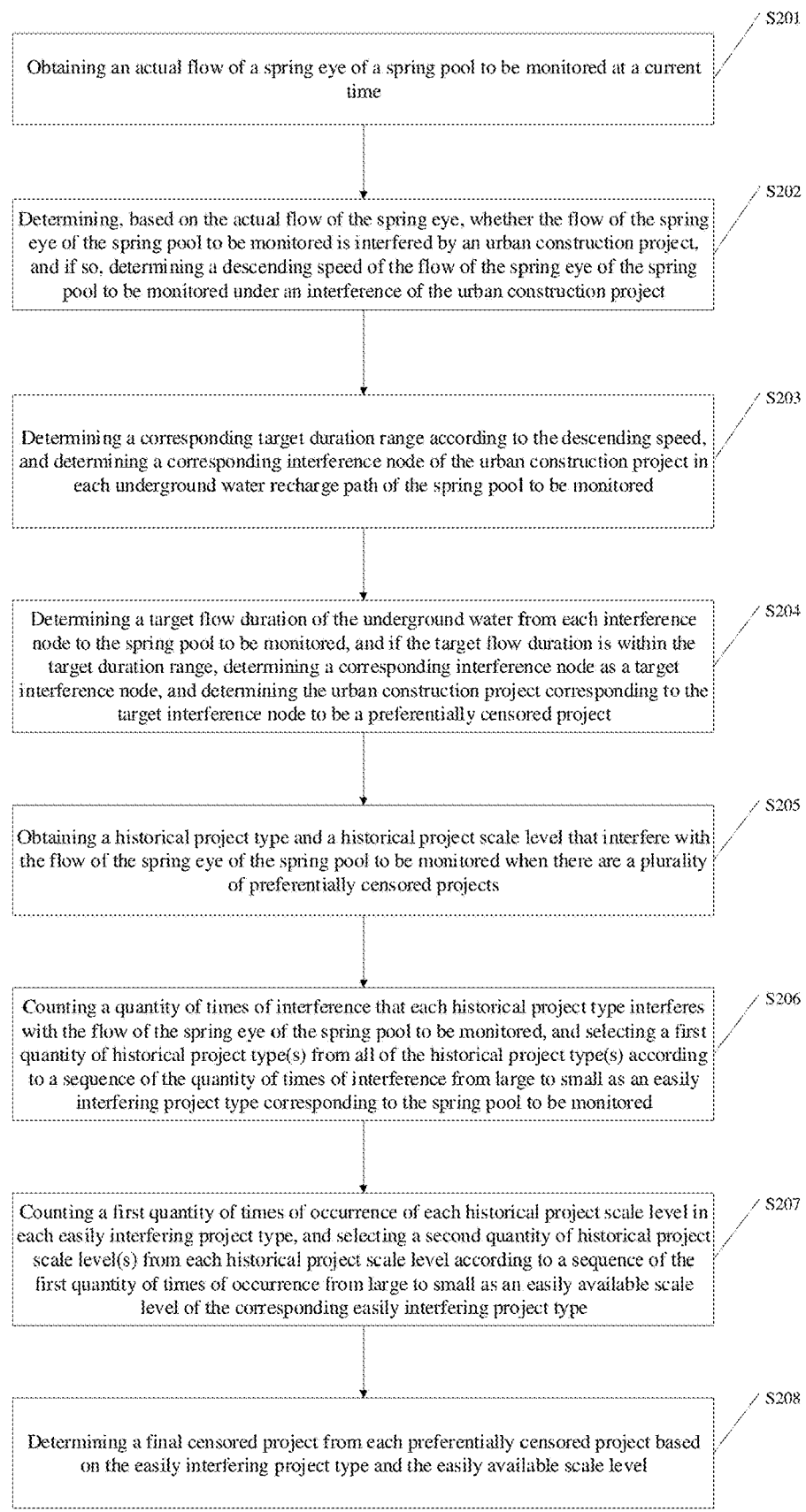
FIG. 2 is a schematic flowchart of another monitoring method for spring protection provided in an embodiment of the present application.

Refer to FIG. 2, the embodiment of the present application discloses a schematic flowchart of another monitoring method for spring protection, which is applied to a monitoring device for spring protection and can also operate on a monitoring device for spring protection based on Von Neumann architecture. The computer program can be integrated into an application or run as an independent tool application, and specifically includes:

S201: an actual flow rate of a spring eye of a monitored spring pool at a current time is obtained.

S202: based on the actual flow rate of the spring eye, whether the flow rate of the spring eye of the monitored spring pool is interfered by an urban construction project is determined. If so, a rate of decline of the flow rate of the spring eye of the monitored spring pool under an interference of the urban construction project is determined.

S203: a corresponding target duration range is determined according to the rate of decline, and a corresponding interference node of the urban construction project is determined in each groundwater recharge path of the monitored spring pool.

S204: a target flow duration of the groundwater from each interference node to the monitored spring pool is determined, and if the target flow duration is within the target duration range, a corresponding interference node is determined as a target interference node, and urban construction project corresponding to the target interference node is determined to be a preferentially censored project.

Specifically, refer to steps S101-S104, which are not described in detail herein.

S205: when there are a plurality of preferentially censored projects, historical project types and historical project scale levels that interfere with the flow rate of the spring eye of the monitored spring pool are obtained.

Specifically, in the embodiment of the present application, the historical project types refer to the types of the historical construction projects that have had an influence on the flow rate of the spring eye of the monitored spring pool. For example, the historical project types can include mining projects, underground tunnel projects or a subway projects. The historical project scale levels refer to the scale levels of these historical construction projects that have an influence on the flow rate of spring eye in the monitored spring pool, and are used to measure the scale sizes of the historical construction projects. A higher historical project scale level is, a larger scale of corresponding historical construction project is. If there are a plurality of preferentially censored projects, in order to save censoring time, it is necessary to determine a first object to be censored; furthermore, relevant information about the historical construction project interfering with the flow rate of the spring eye of the monitored spring pool is filter out from the preset project information records of urban historical projects, a corresponding historical project type is determined according to names of these historical construction projects, and a corresponding historical project scale level is matched from the scale level matching table according to investment amount of each historical construction project, wherein a higher investment amount indicates a higher historical project scale level. It should be noted that the project information records can include records from the past 5 years or from the past 10 years.

S206: interference times of each of the historical project types interferes with the flow rate of the spring eye of the monitored spring pool is counted, and a first quantity of historical project types are selected from all of the historical project types according to a descending order of the interference times as easy-to-interfere project types corresponding to the monitored spring pool.

S207: a first occurrence time of each of the historical project scale level in construction projects of each of the easy-to-interfere project types is counted, and a second quantity of historical project scale levels are selected from the historical project scale levels according to a descending order of first occurrence times as easily available scale levels corresponding to the easy-to-interfere project types.

Specifically, the interference times of the flow rate of the spring eye of the monitored spring pool for each historical project type is counted, and the greater the interference times, the more likely the project of the corresponding historical project type has an influence on the flow rate of the spring eye in the construction, and then according to a descending order of the interference times, a first quantity of historical project types are selected from all the historical project types and are determined as the easy-to-interfere project types corresponding to the monitored spring pool. Furthermore, the first occurrence time of each historical project scale level in the project corresponding to each easy-to-interfere project type is counted, and the larger the first occurrence times, the more likely the project corresponding to the easy-to-interfere project type has the corresponding historical project scale level, and then according to a descending order of the first occurrence times, a second quantity of historical project scale levels are selected from the historical project scale levels, and are determined as easily available scale levels corresponding to the easy-to-interfere project types, namely, easy-to-have scale levels.

S208: a final censored project is determined from the preferentially censored projects based on the easy-to-interfere project types and their scale levels.

Specifically, after each easy-to-interfere project type and the corresponding scale levels are determined, a final censored project is determined from the preferentially censored projects. A feasible implementation method is as follows: a first weight of each easy-to-interfere project type is calculated, and a specific calculation process is that a ratio of an interference times of each easy-to-interfere project type to a sum of the interference times of all easy-to-interfere project types is determined as the first weight. The greater the first weight, the more likely the corresponding easy-to-interfere project type is to interfere with the flow of the spring of the monitored spring pool.

Furthermore, the second weight of each of easily available scale levels corresponding to a same easy-to-interfere project type is calculated, and the specific calculation process is that a ratio of the first occurrence times of a single easily available scale level corresponding to the same easy-to-interfere project type to a sum of the first quantity of occurrence times of all the corresponding easily available scale levels is determined as a second weight. The larger the second weight, the more likely the corresponding easily available scale level is to interfere with the flow rate of the spring of the monitored spring pool.

Furthermore, the target project type and the target investment amount of each preferentially censored project are obtained through a preset urban construction project information query platform, and the target project scale level corresponding to the target investment amount is matched from the scale level matching table. When the target project type of the single preferentially censored project belongs to the easy-to-interfere project type, and the target project scale level of the preferentially censored project also belongs to the corresponding easily available scale level, the first product of the first weight corresponding to each target project type and the second weight corresponding to the target project scale level is calculated. The larger the first product, the greater the probability of interference on the flow rate of the spring eye of the monitored spring pool, and finally, the preferentially censored project corresponding to the maximum product in first products determined as the final censored project.

In other embodiments, after the final censored project is determined, second products of the first weight of the target project type of the final censored project and the corresponding second weights of the easily available scale level are respectively calculated, and according to a descending order of the second products, a third quantity of second products are selected from the second products to form a product set, wherein a combination of the target project type of the final censored project and the easily available scale level corresponding to each second product in the product set is a combination with a greater probability of interference to the flow rate of the spring eye. If the maximum product exists in the product set, which indicates that the interference probability of the final censored project on the flow rate of the spring eye is greater, then it is further verified that the final censored project is the first censored object among the preferentially censored projects, and it is determined that the verification of the final censored project is passed, and finally a censoring reminder of the preferentially censored project is sent to a terminal of a censoring personnel, and the terminal can be a smart phone or a tablet computer.

In one embodiment, after the final censored project is determined, according to the location information of the interference node corresponding to the final censored project, boundary conditions and parameters of the model are manually set, water flow rate data from the interference node corresponding to the final censored project to the spring eye of the monitored spring pool in a preset time is simulated by a groundwater flow model, and a water flow rate curve changing with time is drawn according to the water flow rate data. At the same time, a curve of the actual flow rate of the spring eye of the monitored spring pool within the preset time is determined, for details, see step S102, and description thereof not be repeated here.

Furthermore, the water flow rate curve is fitted to the curve of the actual flow rate of the spring eye to obtain a second fitting rate, and if the second fitting rate is greater than a fitting rate threshold, it indicates that the water flow rate curve is relatively similar to the curve of the actual flow rate of the spring eye, this further verifies that the final censored project is likely to interferes with the flow rate of the spring eye, confirming that the verification is passed. It also excludes that the possibility of the interference nodes in other groundwater recharge paths affecting the curve of the flow rate of the spring eye, thereby reducing pressure of project censoring to a certain extent and improving censoring efficiency. Finally, a censoring reminder of the preferentially censored project is sent to terminal of the censoring personnel for their inspection.

In another embodiment, if the flow rate of the spring eye of the monitored spring pool is not interfered by urban construction projects, then the areas where historical projects that have interfered with the flow of the spring pool are selected from the engineering information records, that is, the regional location information of the historical construction projects that have interfered with the flow of the spring pool. The area where the historical project is located comprises at least one urban construction project. Furthermore, the second occurrence times of each type of easy-to-interfere project in each historical project area are counted, the more the second occurrence times, the more likely it is for the easily interfering project type of engineering to appear in the historical project area, and then, according to a descending order of the second occurrence times, a fourth quantity of historical engineering areas are selected from the historical project areas and determined as easily occurring areas where projects of the corresponding easy-to-interfere project type are easy to occur.

Furthermore, a third weight for each easily occurring area corresponding to the same easy-to-interfere project type is calculated, wherein the third weight is a ratio of the second occurrence times of the same easy-to-interfere project type in the corresponding single easily occurring area to a sum of the second occurrence times of all the corresponding easily occurring areas, and the larger the third weight, the more likely the corresponding easily occurring area is to have the project of the easy-to-interfere project type.

Furthermore, count the number of same easily occurring areas in the easily occurring areas corresponding to all the easy-to-interfere project types, that is the same number, and the easily occurring areas with the largest number of the same easily occurring areas is determined as an important inspected area in the city, that is, areas where a project that interferes with the flow rate of the spring eye is relatively easy to occur. Then, filter the urban construction project belonging to the easy-to-interfere project type in the important inspected area out and determine the target construction project, and when the important inspected area is the easily occurring area corresponding to the project type of the target construction project, the third product of the first weight of each target construction project and the third weight of the corresponding important inspected area is calculated. The larger the third product, the more likely the corresponding target construction project causes interference to the flow rate of the spring eye in the important inspected area, and finally, according to a descending order of the third product, sequentially, the unmanned aerial vehicle is used to carry out targeted inspection of the corresponding construction projects, and to obtain video information of on-site construction of the target construction project. Once there are construction actions interfering with the flow rate of the spring eye, a rapid response can be initiated to ensure better protection for the monitored spring pool.

The implementation principle of the monitoring method of spring protection in the embodiments of the present application is that: if the flow rate of the spring eye is interfered by urban construction projects, it indicates that the flow rate of the spring eye of the monitored spring pool is likely to show a descending trend, then a descending rate of the flow of the spring eye is determined. Then, according to the decline rate, a corresponding target duration range is determined. The faster the decline rate, the quicker the urban construction project interferes with the flow rate of the spring eye of the monitored spring pool. Furthermore, if a target flow duration is within the target duration range, it indicates that the corresponding interference node is likely to cause the flow rate of the spring eye of the monitored spring pool decrease at a descending rate. Consequently, the urban construction project associated with this corresponding interference node is determined as a preferentially censored project, and conducting risk censorship for urban construction project, prioritize the inspection of projects that are designated as high priority, thereby, source can be traced back to the urban construction project that interference with the flow rate of the spring eye efficiently and quickly, and then the intervention can be carried out timely to reduce a risk of the spring drying up of the monitored spring pool.

What has been described above is merely exemplary embodiments of the present disclosure and is not intended to limit the scope of the present disclosure. Such equivalent variations and modifications made according to the teachings of the present disclosure are intended to be within the scope covered by the present disclosure. Other implementations of the present disclosure will be apparent to a person skilled in the art from consideration of the description and practice of the disclosure herein. The present application is intended to cover any variations, uses, or adaptations of the present disclosure following, in general, the principles of the disclosure and including such departures from the present disclosure as come within common knowledge or customary practice in the art to which the disclosure pertains. It is intended that the description and embodiments be considered as exemplary only, with a true scope and spirit of the present disclosure being indicated by the following claims.

What is claimed is:

1. A monitoring device for spring protection by tracing a construction project generating a risk of spring drying, comprising a processor and integrated with a computer program that, when executed by the processor, causes the processor to perform operations comprising:

obtaining an actual flow rate of a spring eye of a spring pool to be monitored at a current time;

based on the actual flow rate of the spring eye, determining whether a flow rate of the spring eye of the spring pool is interfered with by urban construction projects, and when so, determining a descending rate of the flow rate of the spring eye of the spring pool under an interference of the urban construction projects;

determining a corresponding target duration range according to the descending rate, and determining a corresponding interference node of an urban construction project of the urban construction projects in each groundwater recharge path of the spring pool, wherein the corresponding target duration range is a duration range required for the urban construction project to generate interference on the flow rate of the spring eye of the spring pool; and determining a target flow duration of groundwater from each interference node to the spring pool, and when the target flow duration is within the corresponding target duration range, determining the urban construction project corresponding to the corresponding interference node as a preferentially censored project, to reduce the risk of the spring drying up of the spring pool.

2. The monitoring device for spring protection according to claim 1, wherein the determining, based on the actual flow rate of the spring eye, whether the flow rate of the spring eye of the spring pool is interfered with by the urban construction projects comprises:

judging whether the actual flow rate of the spring eye is within a preset standard flow rate range of the spring eye, wherein the preset standard flow rate range of the spring eye is a flow rate range of the spring eye under a normal condition of the spring pool;

when the actual flow rate of the spring eye is not within the preset standard flow rate range of the spring eye, obtaining at least one target flow rate of the spring eye of the spring pool within a preset time after the current time, and determining a curve of the actual flow rate of the spring eye based on the actual flow rate of the spring eye and each of the at least one target flow rate of the spring eye;

fitting the curve of the actual flow rate of the spring eye with a preset curve of a flow rate of the spring eye interfered with by the urban construction projects to obtain a first fitting rate, and when the first fitting rate is greater than a fitting rate threshold, determining that the flow rate of the spring eye of the spring pool is interfered with by the urban construction projects, wherein the curve of the actual flow rate of the spring eye interfered with by the urban construction projects is a curve of the flow rate of the spring eye changing with time under an influence of the urban construction projects; and when the first fitting rate is not greater than the fitting rate threshold, determining that the flow rate of the spring eye of the spring pool is not interfered with by the urban construction projects.

3. The monitoring device for spring protection according to claim 1, wherein the computer program when executed by the processor further causes the processor to perform operations comprising:

obtaining historical project types and historical project scale levels that interfere with the flow rate of the spring eye of the spring pool when there are a plurality of preferentially censored projects from preset project information records of urban historical projects, wherein the historical project scale levels refer to scale levels of historical construction projects that have an influence on the flow rate of the spring eye of the spring pool;

counting interference times that each of the historical project types interferes with the flow rate of the spring eye of the spring pool, and according to a descending order of the interference times, selecting a first quantity of historical project types from all of the historical project types as easy-to-interfere project types corresponding to the spring pool;

counting a first occurrence time of each of the historical project scale levels in construction projects of each of the easy-to-interfere project types, and selecting a second quantity of historical project scale levels from the historical project scale levels according to a descending order of first occurrence times as easily available scale levels corresponding to the easy-to-interfere project types; and determining a final censored project from the plurality of preferentially censored projects based on the easy-to-interfere project types and the corresponding easily available scale levels.

4. The monitoring device for spring protection according to claim 3, wherein the determining the final censored project from the plurality of preferentially censored projects based on the easy-to-interfere project types and the corresponding easily available scale levels comprises:

calculating a first weight of each of the easy-to-interfere project types, the first weight is a ratio of the interference times of the easy-to-interfere project type to a sum of the interference times of all the easy-to-interfere project types;

calculating a second weight for each of the easily available scale levels corresponding to a same easy-to-interfere project type, the second weight is a ratio of the first occurrence times of the easily available scale level corresponding to the same easy-to-interfere project type to a sum of the first occurrence times of all of the corresponding easily available scale levels;

determining a target project type and a target project scale level of each of the plurality of preferentially censored projects, and calculating a first product of the first weight corresponding to the target project type and the second weight of a corresponding target project scale level; and determining the final censored project based on a preferentially censored project of the plurality of preferentially censored projects corresponding to a maximum product among first products.

5. The monitoring device for spring protection according to claim 3, wherein the computer program when executed by the processor further causes the processor to perform operations comprising:

determining a water flow rate curve from the interference node corresponding to the final censored project to the spring pool within a preset time after the current time, and determining a curve of the actual flow rate of the spring eye of the spring pool within the preset time; and fitting the water flow rate curve with the curve of the actual flow rate of the spring eye to obtain a second fitting rate, and when the second fitting rate is greater than a fitting rate threshold, determining that verification of the final censored project is passed, and sending a censoring reminder of the final censored project to a terminal of a censoring personnel.

6. The monitoring device for spring protection according to claim 4, wherein the computer program when executed by the processor further causes the processor to perform operations comprising:

calculating a second product of the first weight of the target project type of the final censored project and a corresponding second weight;

in a descending order of second products, selecting a third quantity of second products from the second products to form a product set; and when a maximum product exists in the product set, determining that verification of the final censored project is passed, and sending a censoring reminder of the final censored project to a terminal of a censoring personnel.

7. The monitoring device for spring protection according to claim 4, wherein the computer program when executed by the processor further causes the processor to perform operations comprising:

when the flow rate of the spring eye of the spring pool is not interfered with by the urban construction projects, obtaining historical project areas that interfere with the flow rate of the spring eye of the spring pool;

counting a second occurrence time of each easy-to-interfere project type in each of the historical project areas, and according to a descending order of second occurrence times, and selecting a fourth quantity of historical project areas from the historical project areas;

calculating a third weight of each of areas corresponding to a same easy-to-interfere project type in the fourth quantity of the historical project areas;

determining an area having a highest number of occurrences among the areas corresponding to all the easy-to-interfere project types as an important inspected area, and screening a target construction project of a type belonging to the easy-to-interfere project types in the important inspected area; and calculating a third product of the first weight of each target construction project and the third weight of a corresponding important inspected area when the important inspected area is the area corresponding to the target construction project, and inspecting a corresponding target construction project through a preset inspection unmanned aerial vehicle according to a descending order of third products.

* * * * *